F. E. JOHNSON, Jr.
ANTICORROSION EXPANSION JOINT.
APPLICATION FILED MAY 16, 1921.
1,434,952.
Patented Nov. 7, 1922.
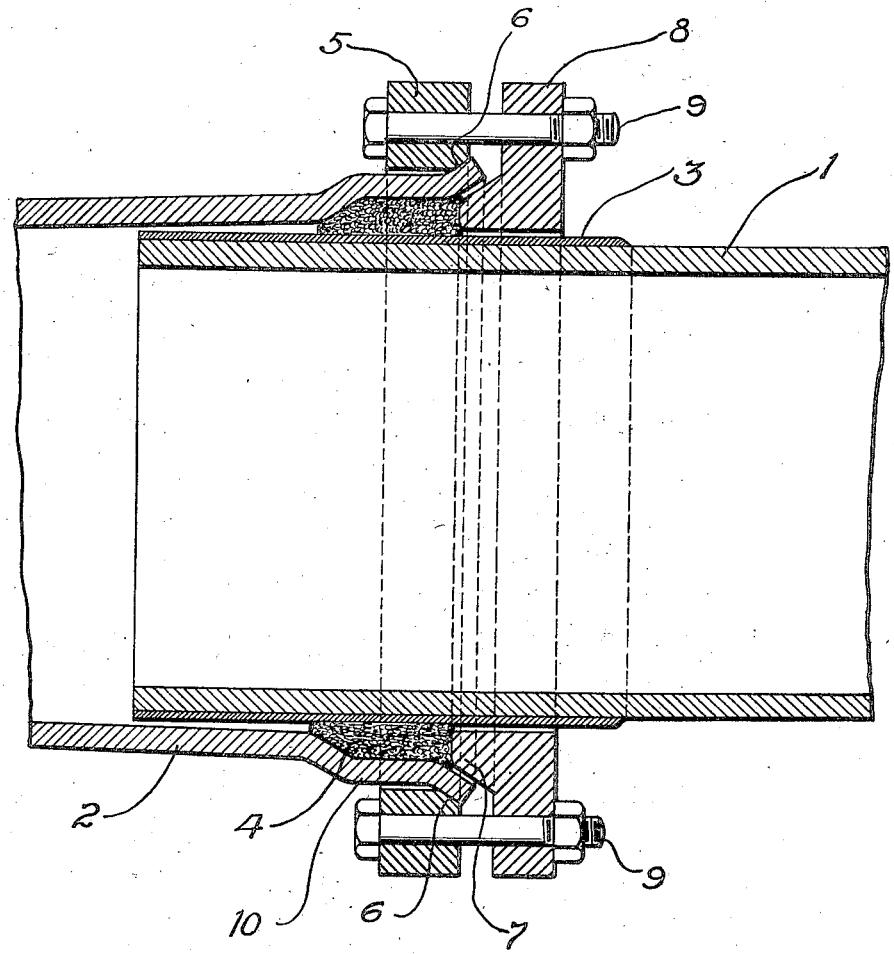
Inventor
F. E. JOHNSON, Jr
By his Attorneys
Sheffield Betts Patented Nov. 7, 1922.

1,434,952

UNITED STATES PATENT OFFICE.

FRANCIS E. JOHNSON, JR., OF ORANGE, NEW JERSEY, ASSIGNOR TO THE M. W. KELLOGG COMPANY, A CORPORATION OF DELAWARE.

ANTICORROSION EXPANSION JOINT.

Application filed May 16, 1921. Serial No. 469,865.

*To all whom it may concern:*

Be it known that I, FRANCIS E. JOHNSON, Jr., a citizen of the United States, residing at Orange, New Jersey, have invented certain new and useful Improvements in Anticorrosion Expansion Joints, of which the following is a disclosure.

My invention relates to an expansion joint and has as its principal object the provision of a joint adapted for use in high pressure hydraulic pipe lines and which shall be proof against leakage and at the same time present small frictional resistance to the intended movement of the parts.

The novel features of my invention are pointed out with particularity in the appended claims. The invention itself, however, will best be understood from the following description taken in connection with the accompanying drawing, in which—

The figure is a longitudinal section of two over-lapping pipe sections connected by an expansion joint according to my invention.

Referring to the drawing, 1 is a section of a hydraulic pipe line. One end of section 1 projects within the end of pipe section 2, section 2 being enough larger than section 1 near their point of connection to enclose the end of section 1 while permitting free relative movement of the sections within the usual limits of design of expansion joints. The joint structure, according to my invention, comprises an anticorrosion and antifriction sleeve 3 fixed on the end of section 1, a ring 4 of packing material, a loose collar 5 bearing against the outer inclined face 6 of pipe section 2, a gland 7 having a flange 8 thereon, and bolts 9, 9 between collar 5 and flange 8 for drawing gland 7 strongly against packing 4. The packing ring 4 is held within an enlarged packing box 10 near the end of the section 2, as is commonly done in such structures, whereby the material of ring 4 is pressed firmly against the outer surface of sleeve 3 and the inner surface of pipe section 2 when the ring is compressed by gland 7. Leakage through or along the surfaces of packing ring 4 is thus entirely prevented.

The sleeve 3, according to my invention, is formed in place on section 1 by electrolysis. Prior to my invention, it has been known to use antifriction sleeves in expansion joints, but these have heretofore been shrunk onto the pipe sections. It has been found that such shrunk on sleeves almost invariably develop leakage, the water passing between the outer surface of the pipe and the inner surface of the sleeve. This leakage is due to the fact that when the sleeve is shrunk on, an absolute contact between the sleeve and pipe cannot be formed at all points around the end of the sleeve. The water enters at points of imperfect contact and gradually works its way to the other end of the sleeve, due to the corrosion of the outer surface of the iron pipe. The sleeves according to my invention, being deposited electrolytically, have perfect contact with the pipes at all points, irrespective of original inequalities in the surface of the pipe, and serve to protect the pipes from corrosion, seepage being impossible for the same reason.

In forming anticorrosion sleeves according to my invention, I prefer to use copper and to deposit the same in place on the pipe by the usual process of depositing copper on iron, the parts of the pipe on which no copper is desired being protected from the electrolytic bath by an insulating paint. When sufficient metal has been deposited, its surface is turned off leaving a sleeve of the desired thickness. This is then polished.

While I prefer to deposit the sleeves according to my invention in place electrolytically, it is within the purview of my invention to form the anti-friction sleeve in the usual way and to seal the end of the sleeve exposed to liquid against moisture by electrolytically depositing a layer of metal across the joint between the sleeve and pipe at this point, or to seal this joint in other ways.

Having thus described my invention, I claim:

1. An expansion pipe joint comprising an internal pipe section having a sleeve thereon of anti-friction, anti-corrosion metal, said sleeve forming a moisture tight joint with said section at the end exposed to fluid flowing within said section.

2. An expansion joint comprising an internal pipe section having a sleeve thereon of anti-friction, anti-corrosion metal, said sleeve being electrolytically connected with said section, at least at the end of the sleeve exposed to fluid flowing within said section, whereby a moisture tight joint is formed at said end of said sleeve.

3. An expansion joint comprising external and internal pipe sections, the inner one of said sections having an anti-corrosion sleeve formed thereon electrolytically, said sleeve having a smooth outer surface, and a packing member bearing against said sleeve.

F. E. JOHNSON, Jr.